US011652395B1

(12) United States Patent
Miesner

(10) Patent No.: US 11,652,395 B1
(45) Date of Patent: May 16, 2023

(54) VOICE COIL ARRAYS

(71) Applicant: The Government of the United States of America, as represented by the Secretary of the Navy, Arlington, VA (US)

(72) Inventor: John E. Miesner, Fairfax, VA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 17/686,535

(22) Filed: Mar. 4, 2022

(51) Int. Cl.
*H02K 33/18* (2006.01)
*H02K 41/035* (2006.01)

(52) U.S. Cl.
CPC ......... *H02K 41/0354* (2013.01); *H02K 33/18* (2013.01)

(58) Field of Classification Search
CPC ............ H02K 33/18; H02K 41/0354–41/0358
See application file for complete search history.

(56) References Cited

U.S. PATENT DOCUMENTS

| | | | |
|---|---|---|---|
| 7,386,144 B2 | 6/2008 | Vincent | |
| 8,582,799 B2 | 11/2013 | Tanabe | |
| 9,277,325 B2 | 3/2016 | Zhang | |
| 9,632,279 B2 | 4/2017 | Chen | |
| 9,894,442 B2 | 2/2018 | Salvatti | |
| 9,942,663 B1 | 4/2018 | Salvatti | |
| 10,063,128 B2 | 8/2018 | Wang | |
| 11,356,779 B2 | 6/2022 | Zhang | |
| 2006/0104472 A1 | 5/2006 | Abe | |
| 2017/0207691 A1* | 7/2017 | Hemati | ................ H02K 41/031 |

FOREIGN PATENT DOCUMENTS

CN 112242785 A * 1/2021 ......... H02K 41/0356

\* cited by examiner

*Primary Examiner* — Ramon M Barrera
(74) *Attorney, Agent, or Firm* — Dawn C. Russell; Jesus J. Hernandez

(57) ABSTRACT

Inertial actuators are provided, which use a one-dimensional or a two-dimensional voice coil array to achieve the same force output performance as a monolithic actuator. The voice coil arrays use less permanent magnet and flux conducting material, and have a lower inductance, while achieving increased frequency bandwidth.

12 Claims, 16 Drawing Sheets

VOICE COIL ARRAYS

FIELD OF THE INVENTION

Inertial actuators are provided, which use a one-dimensional or a two-dimensional voice coil array to achieve the same force output performance as a monolithic actuator. The voice coil arrays use less permanent magnet and flux conducting material, and have a lower inductance, while achieving increased frequency bandwidth.

BACKGROUND OF THE INVENTION

Permanent magnet voice coil inertial actuators employ one or more current conducting coils that reside in a gap through which magnetic flux flows from one or more permanent magnets. The interaction between the current passing through the coil and the magnetic field causes the coil to produce forces perpendicular to the current and the magnetic field, which drive an inertial mass to produce output force into the supporting structure.

A goal of voice coil actuator design is to minimize the amount of permanent magnet material required to establish the magnetic flux. Permanent magnets are relatively expensive, and commonly used permanent magnet materials, such as neodymium, are limited in supply. A second goal is to minimize the amount of magnetic flux conducting material, since this material is heavy and may require lamination to reduce eddy current losses. A third goal is to minimize the coil inductance, because the voltage required to produce a current at a particular frequency is proportional to the inductance at that frequency. The coil inductance is typically the limiting factor that determines the usable frequency bandwidth of the actuator.

The amount of permanent magnet and flux conducting material required depends on the reluctance of the magnetic circuit. Since permanent magnets have a permeability approximately equal to air, a major part of the magnetic circuit reluctance is due to the magnet thickness itself. A magnetic circuit arrangement that uses two or more thin magnets in parallel may require less material than an equivalent circuit with one thick magnet.

Coil inductance depends upon many factors, including: the number of turns in the coil, the area enclosed, and the reluctance of the path that links the magnetic flux from one coil conductor to the others. Conventional voice coil designs commonly use fewer turns than desired from a force generation standpoint in order to minimize the inductance and increase the bandwidth. Some devices use a conducting loop, called a shorting ring or Faraday ring, in the coil flux path. Current induced in this loop counteracts the coil flux, which raises the path reluctance and thereby the inductance.

Accordingly, there is a need in the art for voice coil designs that achieve the same force output performance as a monolithic actuator, while using less permanent magnet and flux conducting material to reduce total size and cost, and also exhibiting lower inductance for increased frequency bandwidth.

SUMMARY OF THE INVENTION

The apparatus and methods of the invention provide inertial actuators, which efficiently integrate a one-dimensional or a two-dimensional voice coil array of smaller components to achieve the same force output performance as a monolithic actuator. The voice coil arrays of the invention use less permanent magnet and flux conducting material, and have a lower inductance, while achieving increased frequency bandwidth.

One aspect of the invention provides a voice coil inertial actuator, which includes: a suspension assembly having a stationary base and movable mounts; coil assembly including: an array of coils wound around bobbins; and coil end holders supporting the bobbins, wherein the coils, bobbins, and coil end holders are joined to move as a unit, and wherein the coil assembly is supported by the movable mounts of the suspension assembly, such that the coil assembly is configured to move vertically relative to the stationary base; and a magnet assembly attached to the stationary base of the suspension assembly, wherein the magnet assembly comprises an array of lateral and vertical permanent magnets in contact with flux concentrators, wherein the flux concentrators correspond to and are aligned with the coils of the coil assembly, such that a concentrated uniform magnetic flux is directed laterally through the coils.

In some aspects of the invention, the coil assembly is configured as a one-dimensional array. In other aspects of the invention, the coil assembly is configured as a two-dimensional array.

Other features and advantages of the present invention will become apparent to those skilled in the art upon examination of the following or upon learning by practice of the invention.

DETAILED DESCRIPTION OF THE INVENTION

Figure 1:
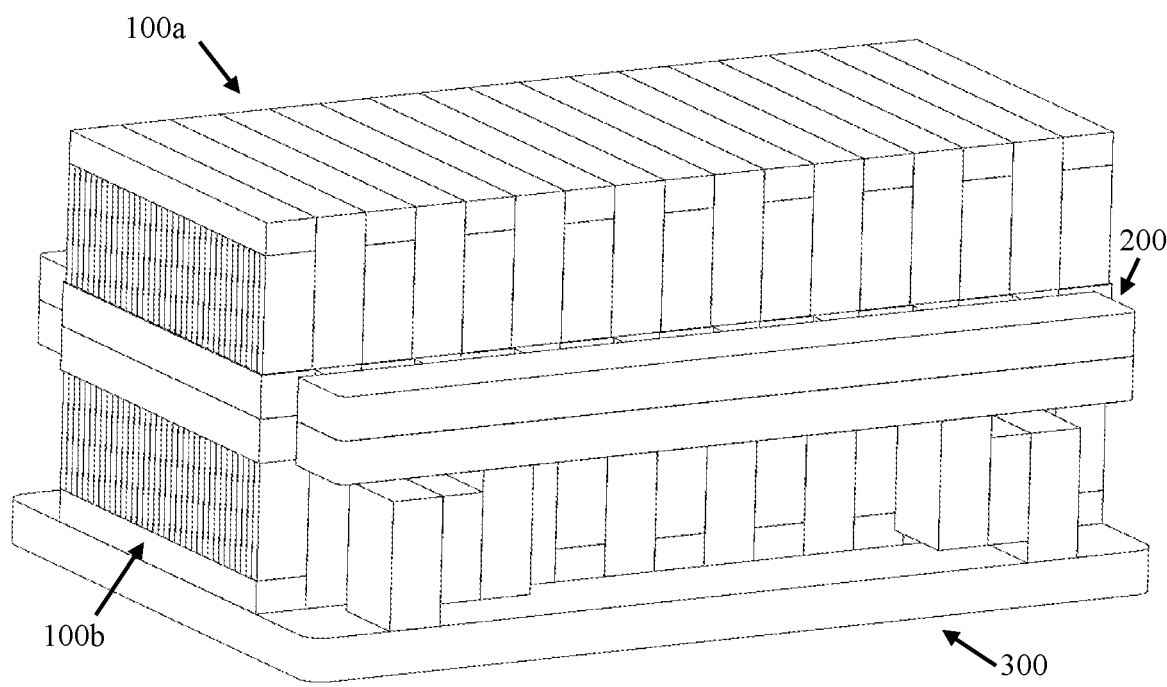
FIG. 1 is an overall view of a one-dimensional voice coil array actuator that illustrates the magnet assemblies, the coil assembly, and the suspension assembly, according to a first embodiment of the invention.

The inventions described herein provide inertial actuators, which use a one-dimensional or a two-dimensional voice coil array to achieve the same force output performance as a monolithic actuator. The voice coil arrays of the invention beneficially use less permanent magnet and flux conducting material, and have a lower inductance, while achieving increased frequency bandwidth.

The voice coil inertial actuators of the invention integrate the one-dimensional or two-dimensional array of components into a single structure that is more compact and lighter than a monolithic actuator, while using less permanent magnet material and having a lower total coil inductance.

The voice coil inertial actuators of the invention preferably include a magnet assembly, a coil assembly, and a suspension assembly.

The magnet assembly includes an array of lateral and vertical permanent magnets in contact with flux concentrators, which direct the magnetic flux through an array of coils in the coil assembly. The interaction between current passing through the coils and the magnetic field produces forces perpendicular to both the current and the magnetic field, resulting in motion of the coil assembly.

The magnet assembly is connected to the base of the suspension assembly, and does not move. In some aspects of the invention, for ease of manufacture, the magnet assembly may be provided as two separate pieces that are joined together to form the finished voice coil inertial actuators. For example, a lower magnet assembly may be connected to the base of the suspension assembly. The coil assembly is then positioned on the suspension assembly by aligning openings in the centers of the coils (and optionally openings between coils) so that flux concentrators of the lower magnet assembly extend through the openings. The upper magnet assembly is then positioned such that it is supported by the lower magnet assembly, by aligning the flux concentrators of the upper magnet assembly with the openings in the coil assembly. The upper magnet assembly is then affixed to the lower magnet assembly. In some aspects of the invention, the upper and lower magnet assemblies are permanently affixed together. In other aspects of the invention, the upper and lower magnet assemblies are releasably affixed, to permit disassembly of the voice coil inertial actuator for maintenance.

The coil assembly is not affixed to the magnet assembly. It is supported by the suspension assembly through an elastomeric shear mount that allows the coil assembly to move relative to the suspension assembly base. The motion of the coil assembly generates inertial forces, which produce equal and opposite forces in the magnet assembly that are transmitted to the base of the suspension assembly.

The magnets and flux concentrators of the magnet assembly may be arranged in a one-dimensional or two-dimensional array. The magnets are preferably polarized such that they form a one- or two-dimensional Halbach array, with the magnetic flux being primarily directed into the flux concentrators with very little magnetic flux outside of the magnet assemblies. Magnetic flux flows between the flux concentrators as a uniform magnetic field through the coils. The reluctance of the flux path of each permanent magnet in the array is less than would be seen by equivalent magnets in a monolithic actuator. Thus, the use of magnet arrays requires less total permanent magnetic material and less flux conducting material than would be required in a monolithic actuator that produces similar forces.

The coils in the coil assembly are arranged in a one- or two-dimensional array, with coil positions corresponding to the positions of flux concentrators in the magnet assembly, permitting the flux concentrators of the magnet assemblies to extend into openings in the coil assembly. Coils are connected in series or parallel, as desired, to produce a single circuit with a single current input and output. Reversing the direction of current input reverses the direction of current in all coils, which reverses the direction of force produced. The array of coils has a lower total inductance than a single equivalent coil because the flux from one coil does not appreciably link with the flux from another coil. Additional inductance reduction is accomplished by shorting rings, which form a continuous electrically-conducting path around each flux concentrator to cancel the coil magnetic flux and further reduce the flux linkage within each coil. Low inductance increases the frequency bandwidth of the voice coil array actuator. The shorting rings are attached to the flux concentrators and do not move with the coils.

There are three presently-preferred embodiments of the voice coil inertial actuator of the present invention. Embodiments one and two employ a one-dimensional array of magnets, flux concentrators, and coils. Embodiment three employs a two-dimensional array of these components.

Embodiments one and two differ only in the coil assembly. The coils in both embodiment one and embodiment two are arranged with a flux concentrator in the center of the coil. In embodiment one, the coils are spaced such that there is also a flux concentrator between adjacent coils. In embodiment two, the coils are provided adjacent to one another. In embodiment one, the current flows in the same direction in each coil. In embodiment two, each clockwise coil is next to a counterclockwise coil. In both embodiments, moving laterally across the coil array the current alternates in direction. The coil end supports also differ in embodiment one and two in order to accommodate the coil size and spacing.

Figure 7:
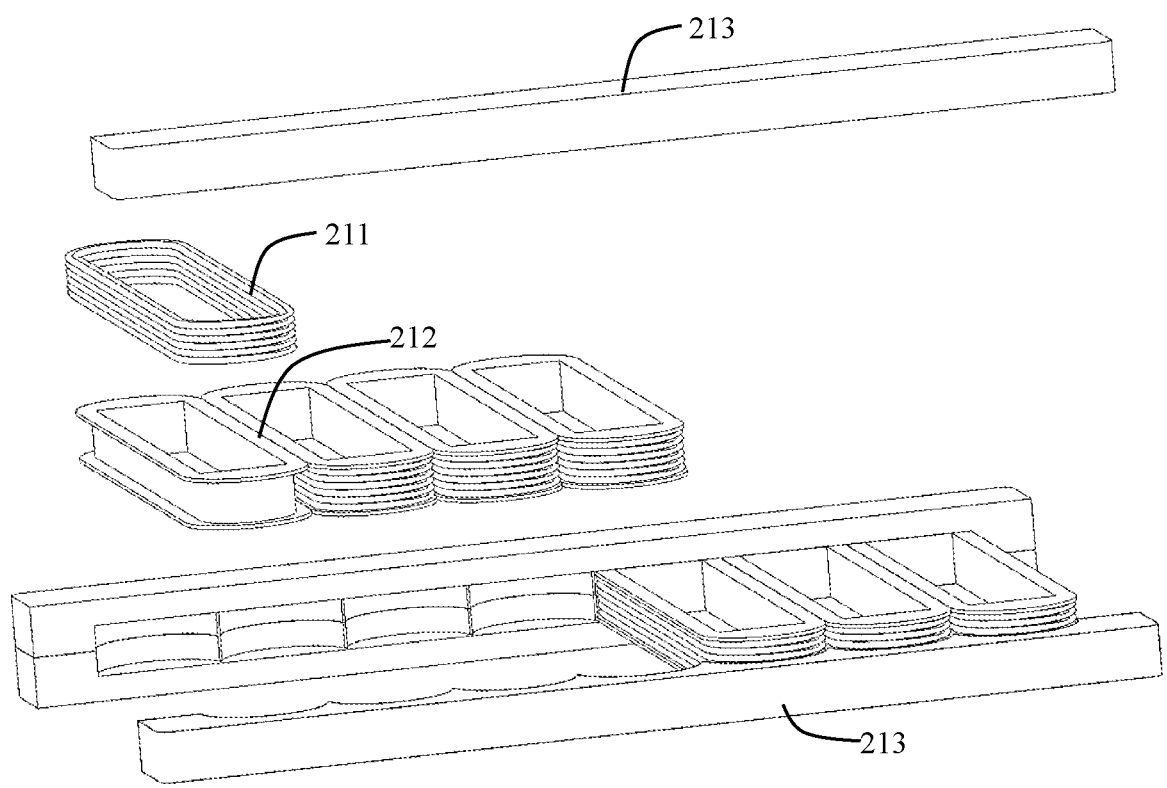
FIG. 7 is an exploded view of the coil assembly of a one-dimensional voice coil array actuator according to a second embodiment of the present invention.
Figure 8:
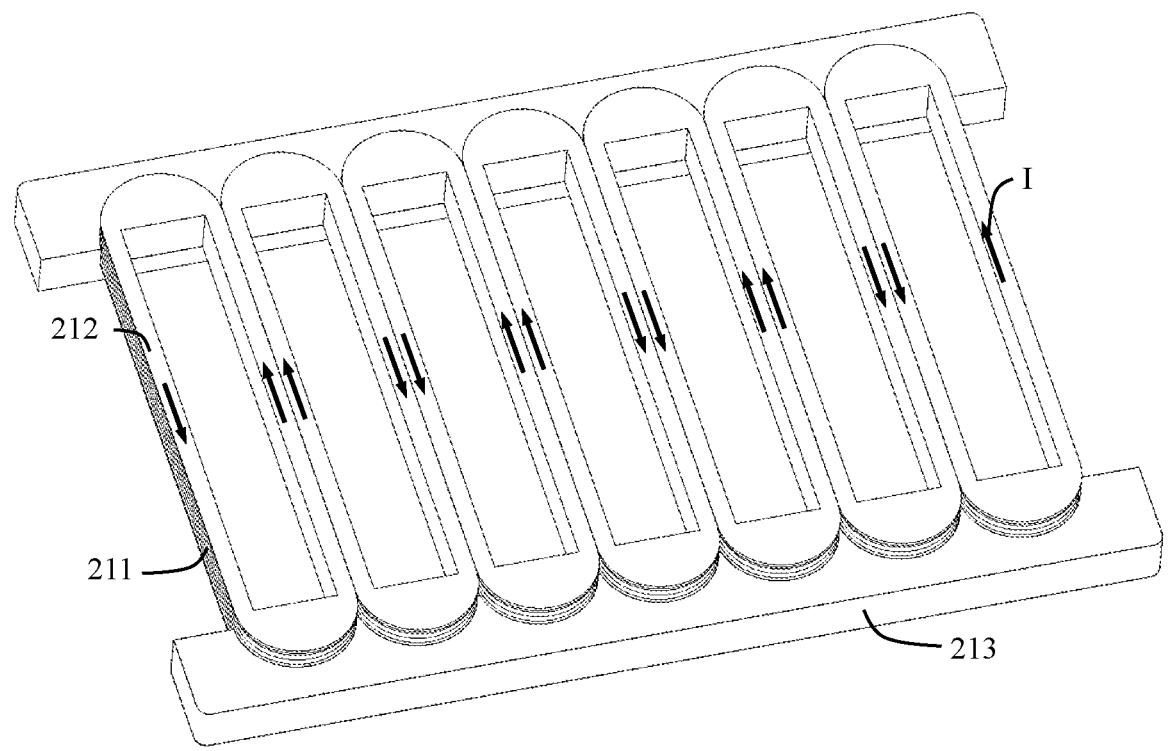
FIG. 8 is a partial view of the coil assembly of a one-dimensional voice coil array actuator according to a second embodiment of the present invention.
Figure 9:
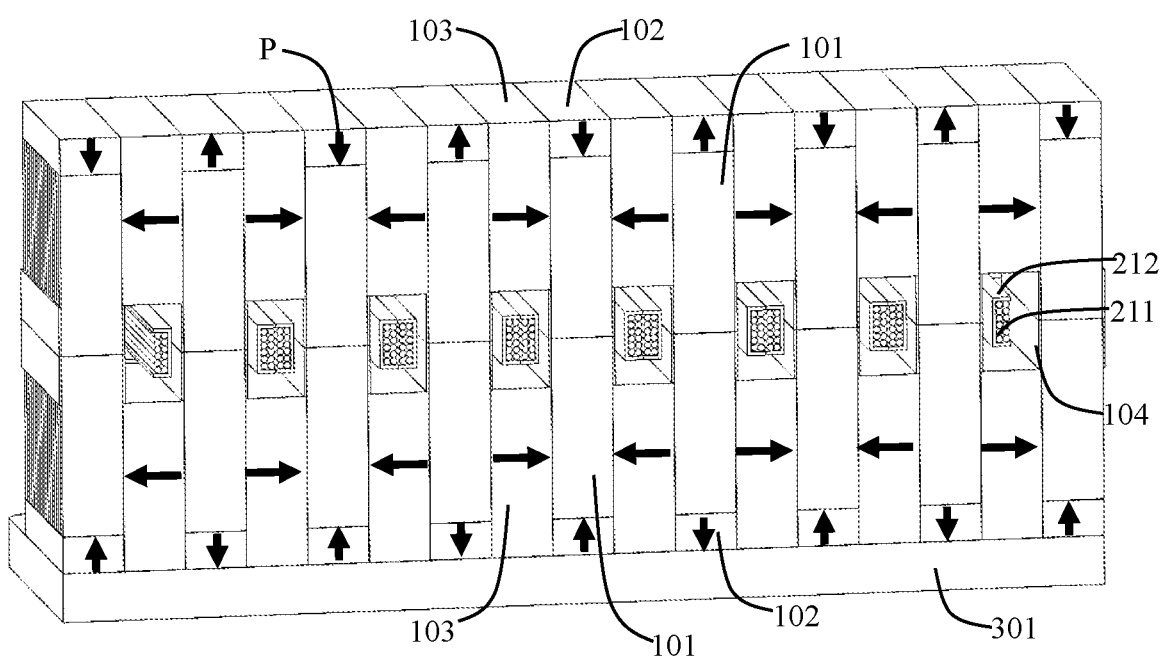
FIG. 9 is a cross-sectional view of a one-dimensional voice coil array actuator according to a second embodiment of the present invention.

The voice coil inertial actuator of the first embodiment is shown in FIGS. 1-6. The differences in the configuration of the coil assembly of the voice coil inertial actuator of the second embodiment are shown in FIGS. 7-9.

Embodiment three operates on the same principles as embodiments one and two, but the two-dimensional array of magnets and coils requires structural differences in all components. Coils are arranged with a flux concentrator in the center of the coil and with adjacent coils next to each other, as in embodiment two. Each clockwise coil is next to a counterclockwise coil, as in embodiment two, such that when moving laterally across the coil array the current alternates in direction. A two-dimensional array does not allow supporting coils on the ends, as is provided in embodiments one and two. The coils in embodiment three are supported by an edge support and top and bottom support plates.

The voice coil inertial actuator of the third embodiment is shown in FIGS. 10-16.

The invention will now be described by reference to the drawings.

FIG. 1 is an overall view of one-dimensional voice coil array actuator (10), showing top and bottom magnet assemblies (100a, 100b), coil assembly (200), and suspension assembly (300). Coil assembly (200) is supported by suspension assembly (300) and moves vertically relative to it and to the joined top and bottom magnet assemblies (100a, 100b). Movement of coil assembly (200) generates inertial forces that are transferred to top and bottom magnet assemblies (100a, 100b) and then to suspension assembly (300).

Figure 2:
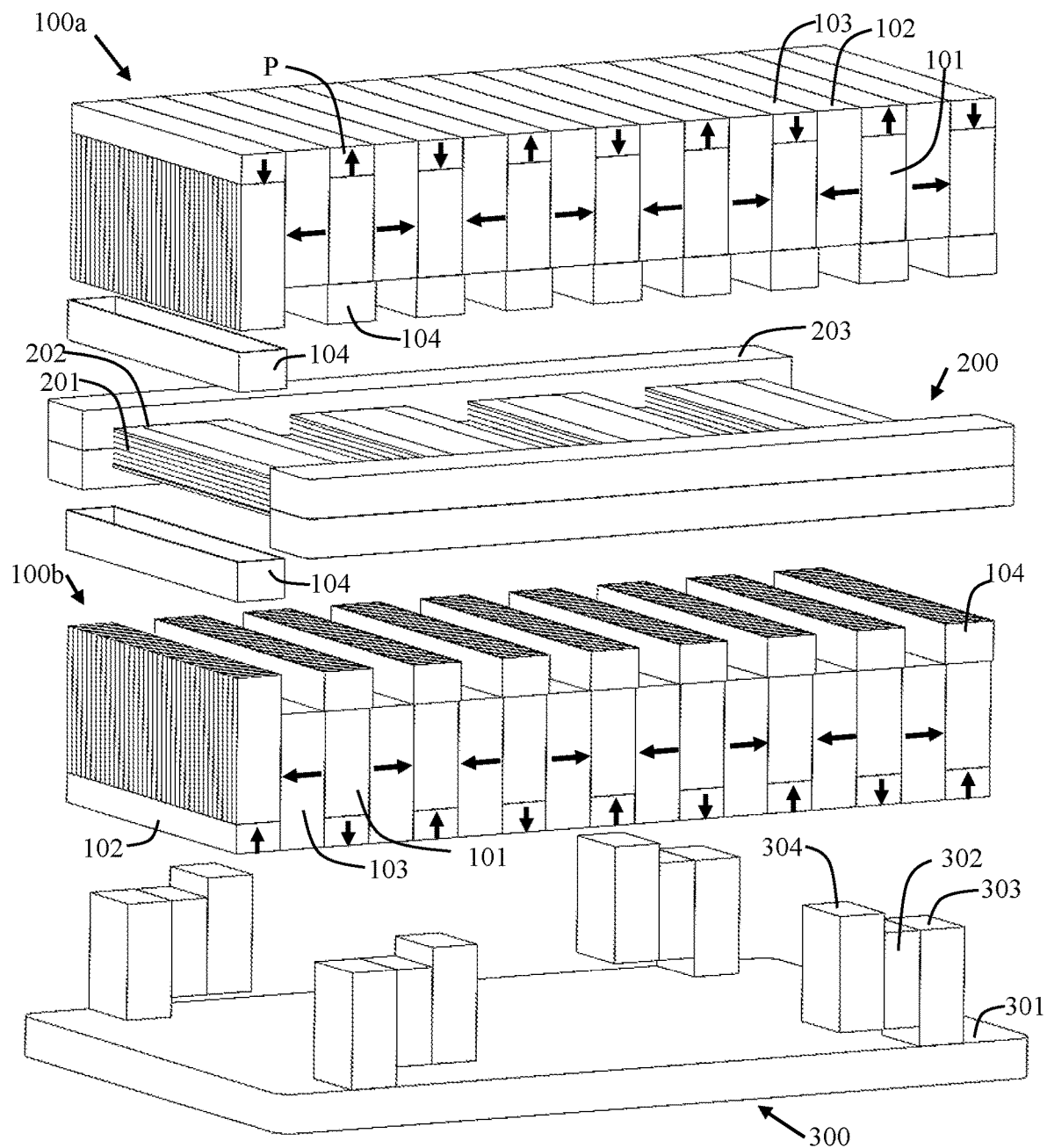
FIG. 2 is an exploded view of a one-dimensional voice coil array actuator according to a first embodiment of the present invention.

FIG. 2 is an exploded view of one-dimensional voice coil array actuator (10), showing all components. Top and bottom magnet assemblies (100a, 100b) include lateral magnets (103) and vertical magnets (102) in contact with flux concentrators (101) and shorting rings (104) around the flux concentrators (101). The arrows (P) superimposed on lateral magnets (103) and vertical magnets (102) show their polarization direction. The magnet polarization pattern shown, with alternating up and down polarization interspaced with alternating left and right polarization, is commonly known as a linear Halbach array. Lateral magnets (103) and vertical magnets (102) are preferably made of high strength magnetic material, preferably a magnetic material comprising Neodymium, such as Neodymium Iron Boron (NdFeB). Flux concentrators (101) are preferably made of silicon steel or magnetic stainless steel to provide high permeability and low hysteresis. The flux concentrators (101) are preferably formed by assembling multiple thin laminations, as shown in FIG. 2, in order to reduce eddy currents. Shorting rings (104) are preferably made from electrically conductive material such as copper.

Coil assembly (200) includes coils (201) wound around coil bobbins (202) supported by coil end holders (203). As shown, there are four coils (201) in coil assembly (200), forming a one-dimensional array. Coils (201) are preferably wound from insulated copper wire manufactured for coils, known as magnet wire. Coil bobbins (202) are preferably made from high modulus non-conducting and nonferrous material such as fiberglass or carbon fiber epoxy composites. Coil end holders (203) are preferably made from material with high electrical and thermal conductivity, such as aluminum. It should be noted that coil end holders (203) provide mechanical support, but also serve to reduce flux linkage and inductance and to transfer heat from the coils (201).

Suspension assembly (300) includes a base plate (301) and shear elements (302) bonded between bottom rigid elements (303) and top rigid elements (304). Bottom magnet assembly (100b) is attached to base plate (301), and coil assembly (200) is attached to top rigid elements (304). Shear elements (302) distort in shear to allow motion of coil assembly (200) relative to the rest of one-dimensional voice coil array actuator (10). Shear elements (302) are preferably made of an elastomer, such as rubber, with a low shear modulus and a high allowable strain range. The base plate (301), bottom rigid elements (303), and top rigid elements (304) are not particularly limited in composition; any ferrous or non-ferrous material capable of supporting the magnet assembly may be selected. In some aspects of the invention, aluminum is preferred.

Figure 3:
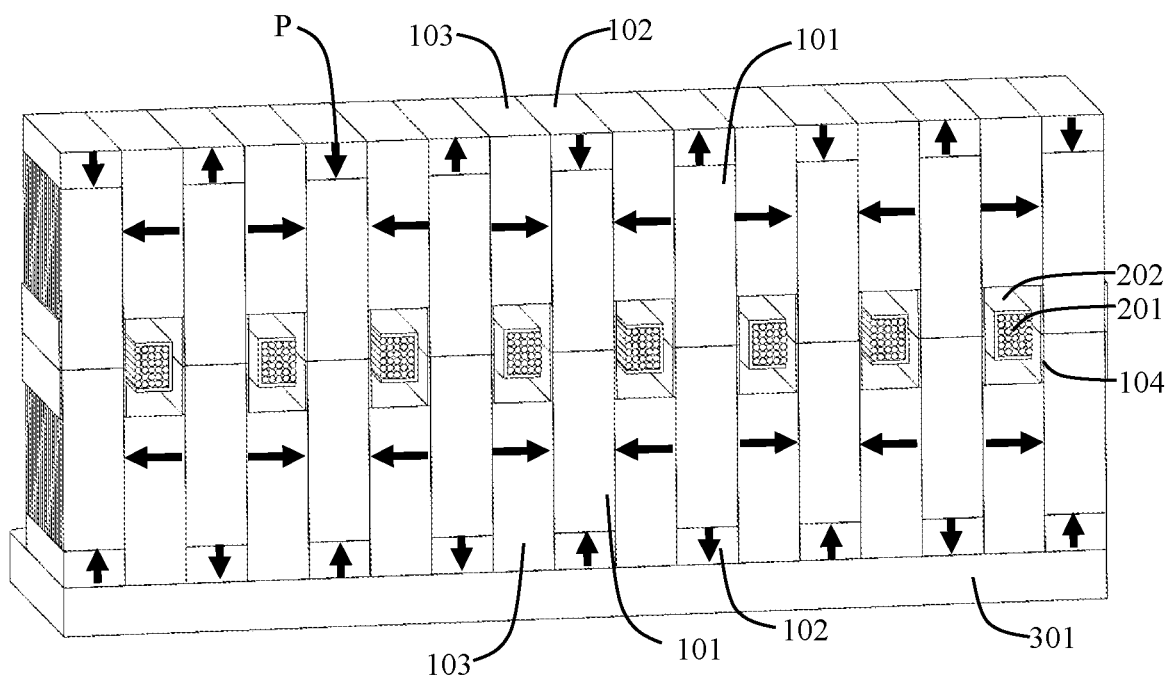
FIG. 3 is a cross-sectional view of a one-dimensional voice coil array actuator according to a first embodiment of the present invention.

FIG. 3 is a cross-sectional view of one-dimensional voice coil array actuator (10) illustrating the relative arrangement of components. It can be seen in FIG. 2 that each shorting ring (104) forms a complete conducting loop around each flux concentrator (101) inside of coils (201), and between coils. When current flows through coil (201) it induces current loops in shorting ring (104), which cancels the magnetic flux from the coil to reduce the flux linkage and inductance of the coil. It also prevents flux from entering flux concentrators (101) and linking with the other coils (201). Thus, the total inductance of all of the coils (201) is lower than would be exhibited by a single equivalent coil. Flux linkage is directly related to inductance, and in some aspects of the invention, the flux linkage is decreased by at least 25%, preferably by at least 50%. Larger decreases in flux linkage and inductance may be achieved, but may require decreases in coil size and magnets, and corresponding reductions in flux.

Figure 4:
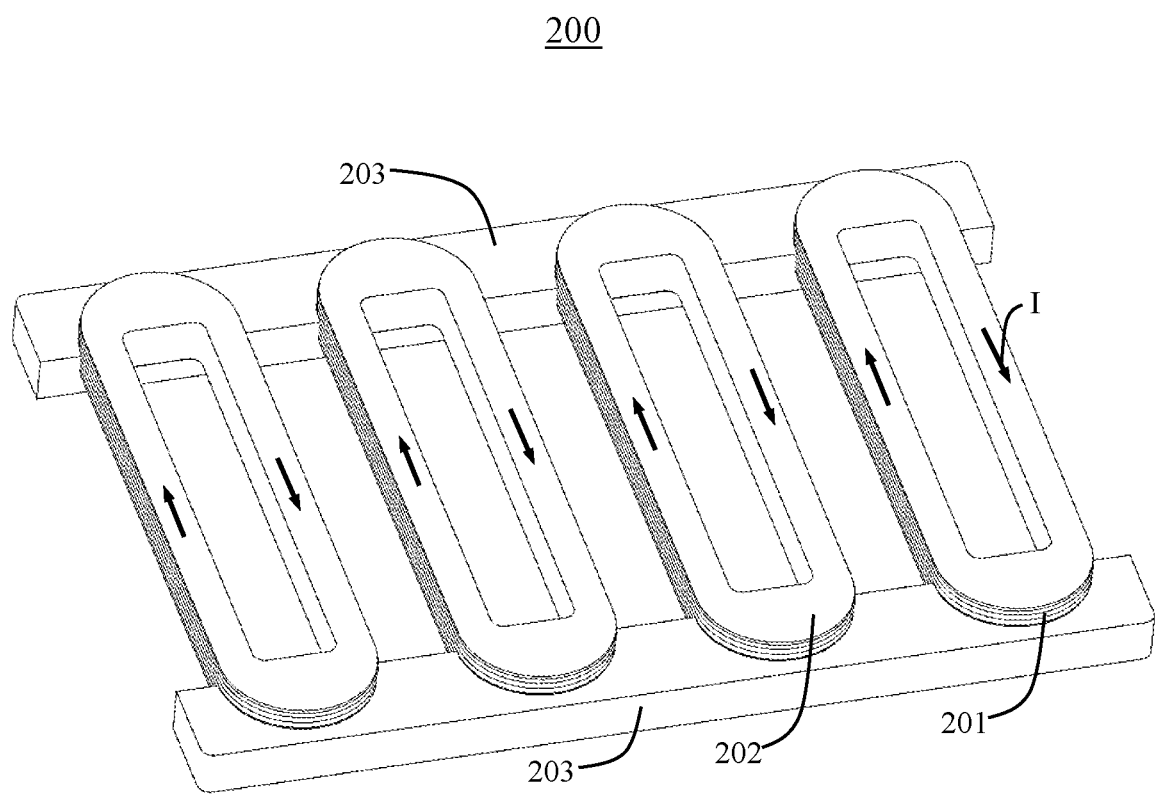
FIG. 4 is a partial view of the coil assembly of a one-dimensional voice coil array actuator according to a first embodiment of the present invention.

FIG. 4 is a view of coil assembly (200) with the upper coil end holders (203) removed to expose the coils (201) and bobbins (202). Arrows (I) illustrate the relative direction of current flow in each coil, which is clockwise as shown. Note that moving laterally across the coil array the current alternates in direction. Coils (201) are connected in series or parallel, as desired, to produce a single circuit with a single current input and output. Reversing the direction of current input reverses the direction of all arrows shown in FIG. 4, which reverses the direction of the force produced. Each coil (201) interior allows room for a flux concentrator (101) and the lateral spacing between coils also allows room for a flux concentrator (101), as shown in FIG. 3.

Figure 5:
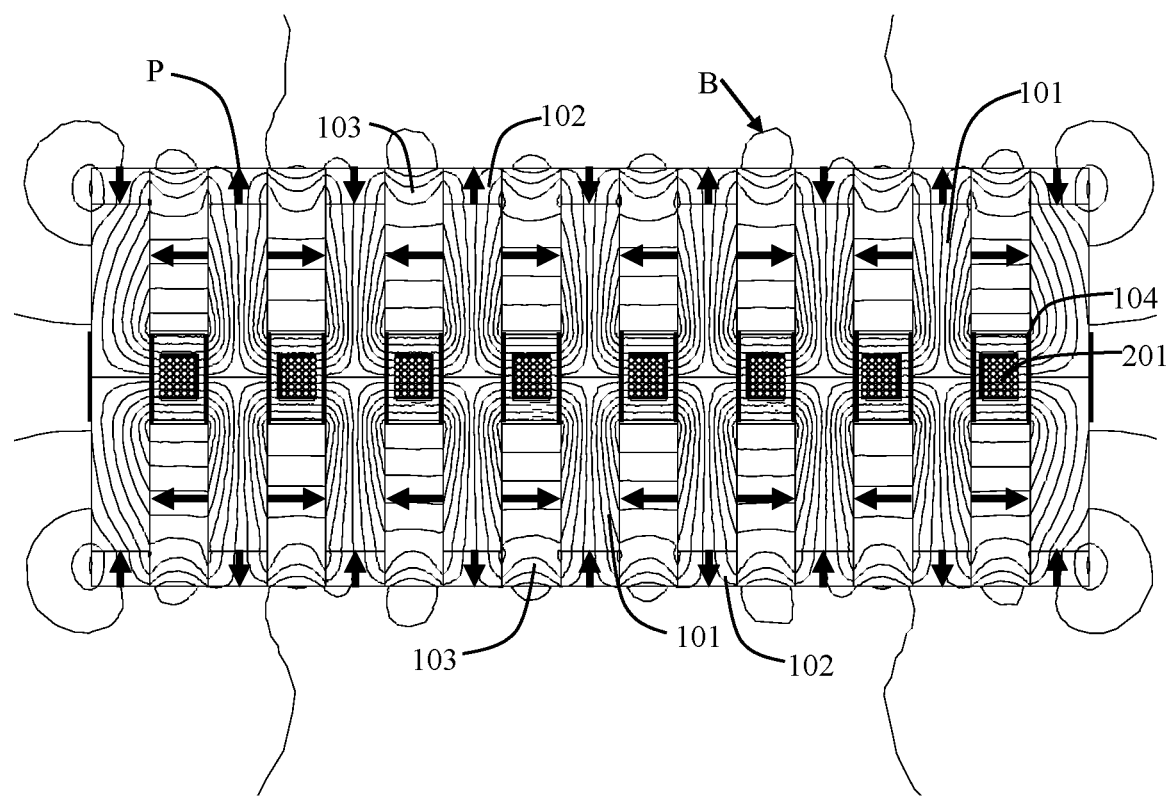
FIG. 5 illustrates a magnetic model of a one-dimensional voice coil array actuator according to a first embodiment of the present invention.

FIG. 5 is a cross-sectional finite element magnetic model of one-dimensional voice coil array actuator (10), showing calculated lines of magnetic flux (B) from lateral magnets (103) and vertical magnets (102). Here it can be seen that the Halbach pattern, with alternating up and down polarization interspaced with alternating left and right polarization, produces a high magnetic flux (B) into the flux concentrators (101) of each magnet assembly (100a, 100b) with very little flux (B) directed outside of voice coil array actuator (10). In some aspects of the invention, less than about 10% of the flux produced by the magnets is directed outside of the voice coil array actuators of the invention, preferably less than about 5%. The magnetic flux from the top and bottom magnet assemblies (100a, 100b) combine to produce a very high uniform magnetic flux through the coils (201). The interaction between current passing through the coils (201), as shown in FIG. 4, and the magnetic field, as shown in FIG. 5, produces forces perpendicular to both (which is up-and-down as drawn). It should also be noted that the reluctance of flux paths of lateral magnets (103) and vertical magnets (102) are less than would be seen by equivalent magnets in a monolithic actuator. Thus, the use of magnet arrays in voice coil array actuator (10) requires less total permanent magnetic material and less flux conducting material than would be required in a monolithic actuator that produces similar forces.

Figure 6:
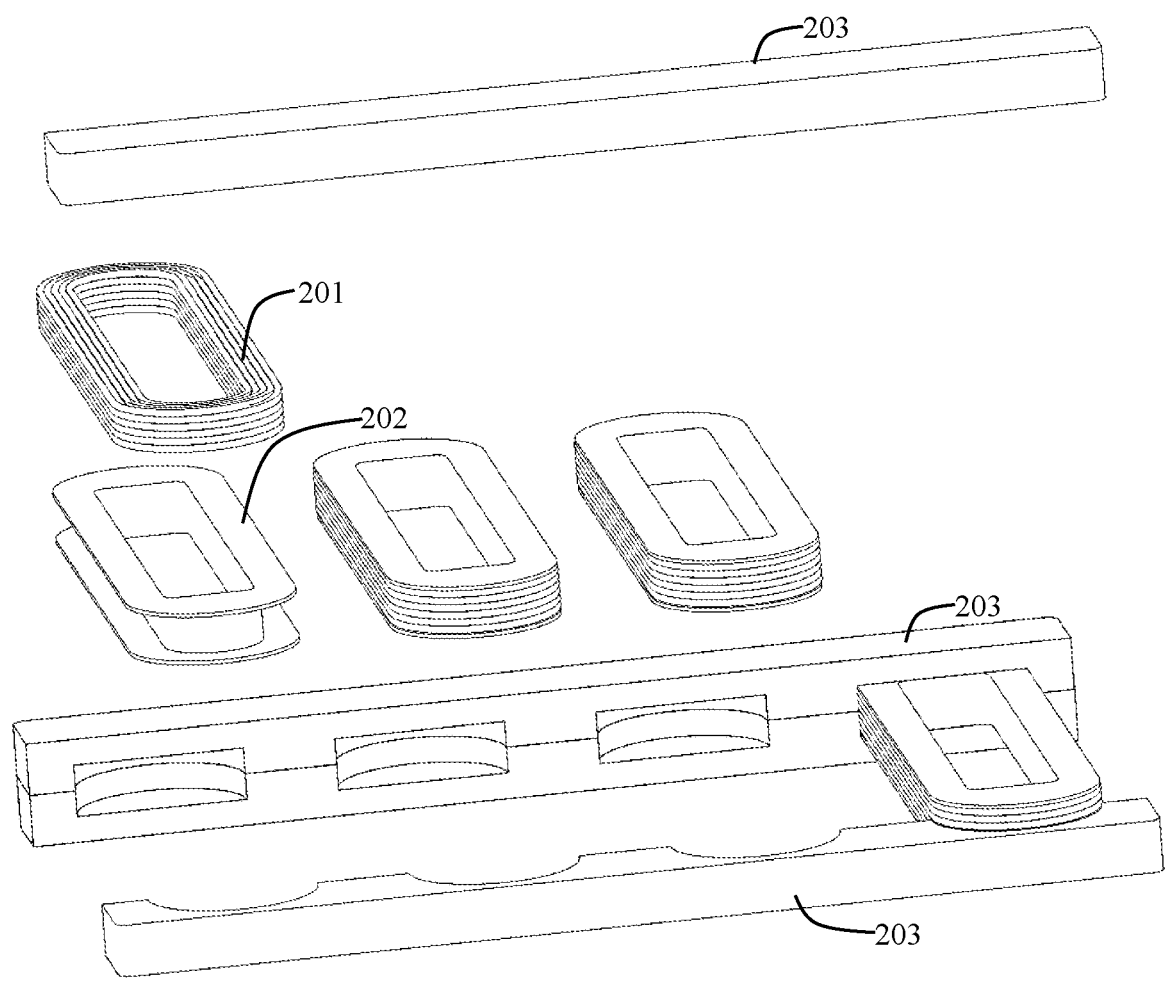
FIG. 6 is an exploded view of the coil assembly of a one-dimensional voice coil array actuator according to a first embodiment of the present invention.

FIG. 6 is an exploded view of coil assembly (200), showing additional detail. Here it can be seen that the four coils (201) are wound around coil bobbins (202), which are supported by coil end holders (203).

FIG. 7 is an exploded view of coil assembly (210), in accordance with the second embodiment of one-dimensional voice coil array actuator (10). Here, the four coils (201) and bobbins (202) with lateral spacing between them of the first embodiment are replaced with seven coils (211) and bobbins (212) without lateral spacing between them. Each coil (211) interior allows room for a flux concentrator (101), as in the first embodiment. All components not shown in FIG. 7 remain the same as in the first embodiment.

FIG. 8 is a view of coil assembly (210) for a second embodiment of one-dimensional voice coil array actuator (10) with two of the coil end holders (213) removed to expose the coils (211) and bobbins (212). Arrows (I) illustrate the relative direction of current flow in each coil, with each clockwise coil being next to a counterclockwise coil as shown. Note that moving laterally across the coil array, the current direction alternates as it did in the first embodiment. Coils (211) are connected in series or parallel, as desired, in order to produce a single circuit with a single current input and output. Reversing the direction of current input reverses the direction of all arrows shown on FIG. 8, which reverses the direction of force produced.

FIG. 9 is a cross-sectional view of the second embodiment of one-dimensional voice coil array actuator (10), illustrating the relative arrangement of components. It can be seen that each shorting ring (104) forms a complete conducting loop around each flux concentrator (101) inside of a coil (211). When current flows through coils (211) it induces current loops in shorting ring (104), which cancels the magnetic flux from the coils to reduce the flux linkage and inductance of the coils. It also prevents flux from entering flux concentrators (101) and linking with the other coils (211). Thus, the total inductance of all of the coils (211) is lower than would be exhibited by a single equivalent coil.

Figure 10:
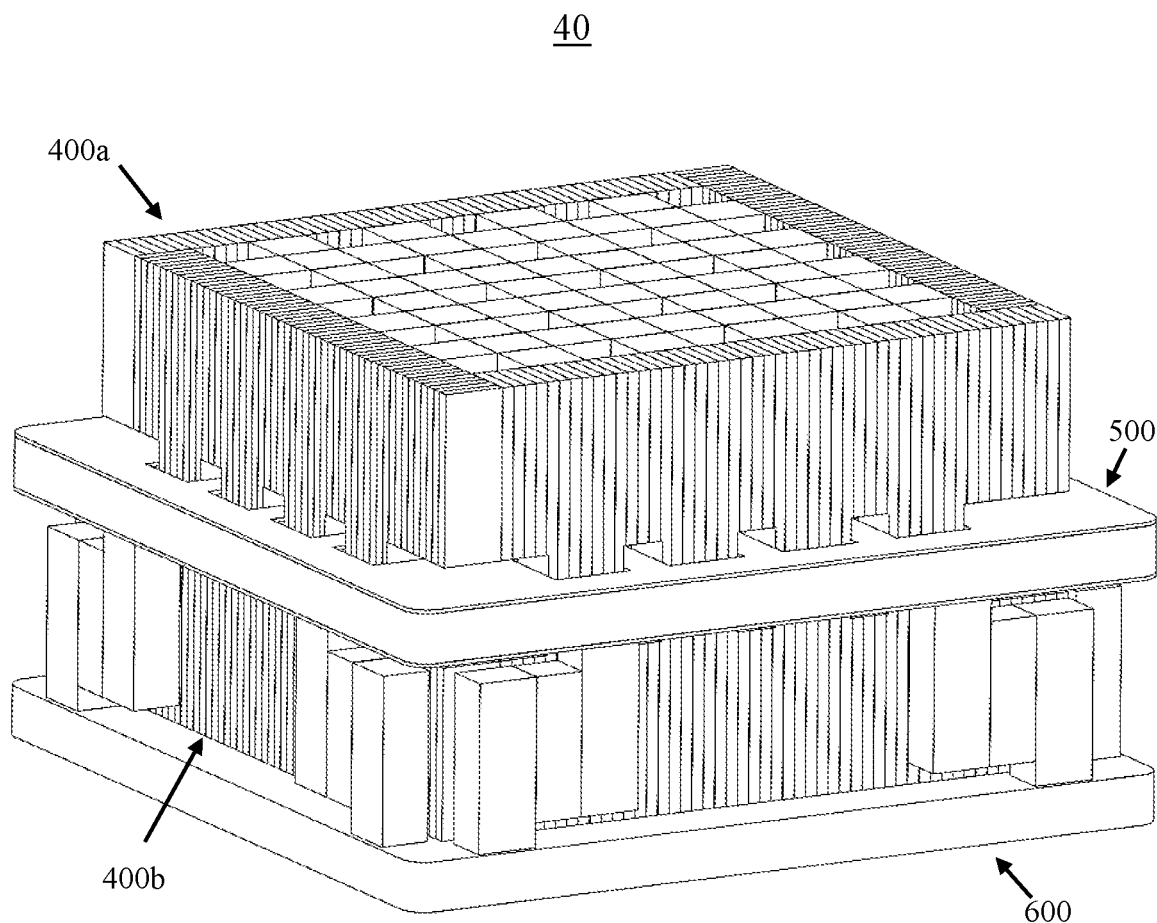
FIG. 10 is an overall view of a two-dimensional array voice coil actuator according to a third embodiment of the present invention.

FIG. 10 is an overall view of two-dimensional array voice coil actuator (40) according to a third embodiment of the present invention. Top and bottom magnet assemblies (400a, 400b), coil assembly (500), and suspension assembly (600) are shown. Coil assembly (500) is supported by suspension assembly (600) and moves vertically relative to it and to top and bottom magnet assemblies (400a, 400b). Movement of coil assembly (500) generates inertial forces that are transferred to top and bottom magnet assemblies (400a, 400b), and then to suspension assembly (600).

Figure 11:
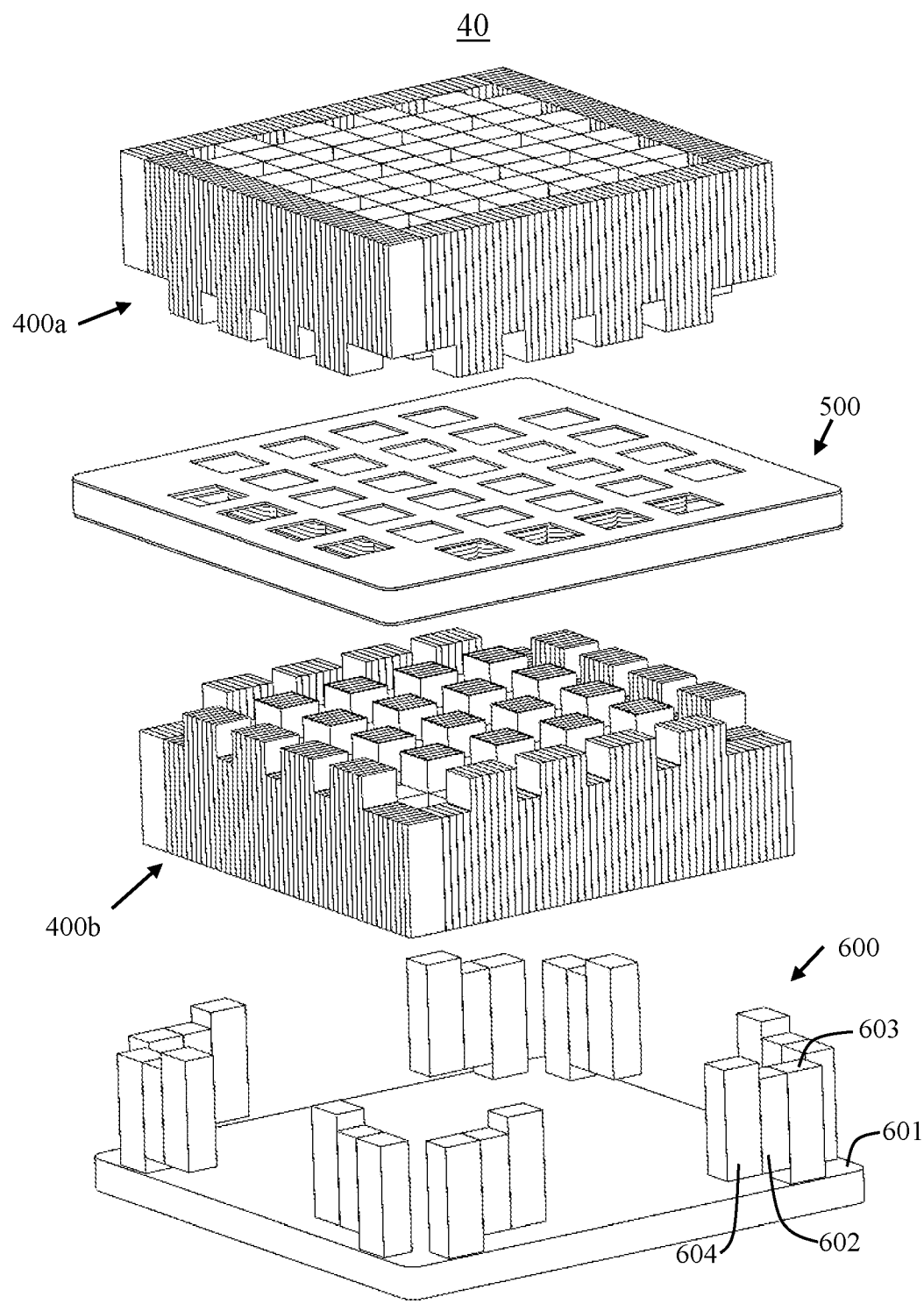
FIG. 11 is an exploded view of a two-dimensional array voice coil actuator according to a third embodiment of the present invention.

FIG. 11 is an exploded view of two-dimensional array voice coil actuator (40) according to the third embodiment of the present invention. Suspension assembly (600) includes a base plate (601) and shear elements (602) bonded between bottom rigid elements (603) and top rigid elements (604). Bottom magnet assembly (400b) is attached to base plate (601). Coil assembly (500) is attached to top rigid elements (604). Shear elements (602) distort in shear to allow motion of coil assembly (500) relative to the rest of two-dimensional voice coil array actuator (40). Shear elements (602) are preferably made of an elastomer, such as rubber, with a low shear modulus and a high allowable strain range. The base plate (601), bottom rigid elements (603), and top rigid elements (604) are not particularly limited in composition; any ferrous or non-ferrous material capable of supporting the magnet assembly may be selected. In some aspects of the invention, aluminum is preferred.

Figure 12:
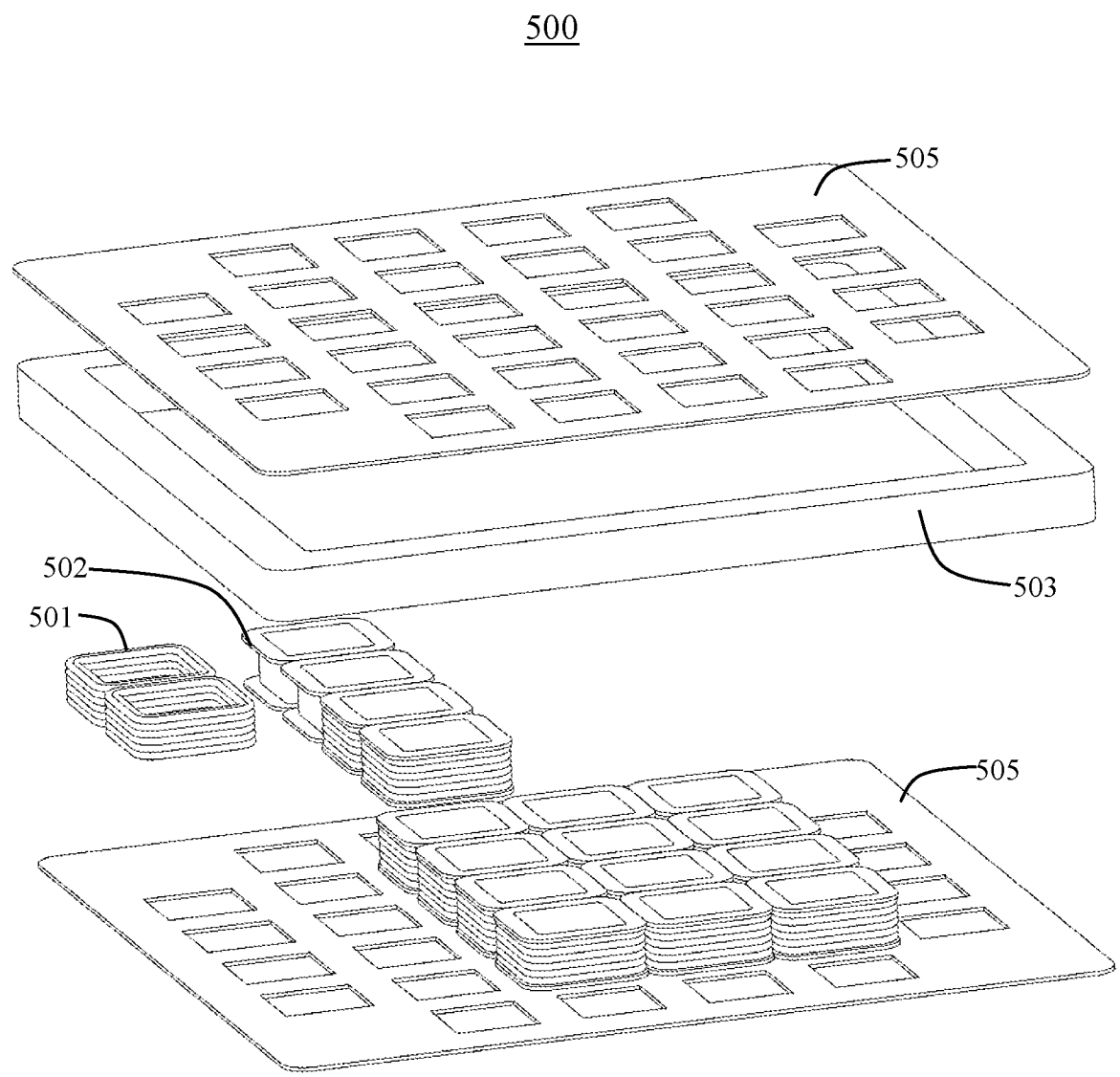
FIG. 12 is an exploded view of the coil assembly of a two-dimensional voice coil array actuator according to a third embodiment of the present invention.

FIG. 12 is an exploded view of coil assembly (500) showing additional detail. Here it can be seen that coils (501) are wound around coil bobbins (502), which are supported by top and bottom support plates (505), which are connected to edge support (503). As shown, the coils (501) and bobbins (502) form a 4×4 array with uniform spacing. Coils (501) are preferably wound from insulated copper wire manufactured for coils, known as magnet wire. Coil bobbins (502) and top and bottom support plates (505) are preferably made from high modulus non-conducting and nonferrous material, such as fiberglass or carbon fiber epoxy composite. Edge support (503) is preferably made from material with high electrical and thermal conductivity, such as aluminum.

Figure 13:
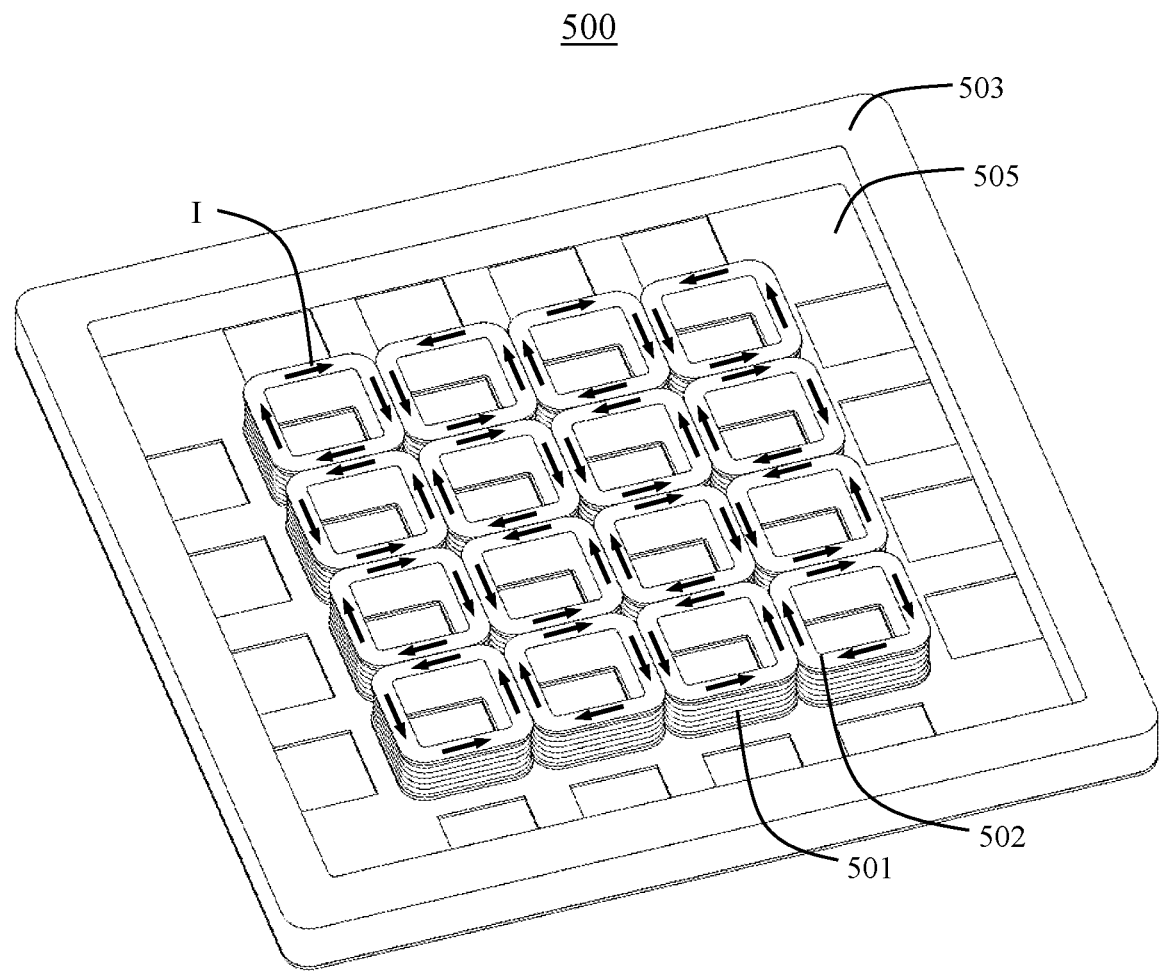
FIG. 13 is a partial view of the coil assembly of a two-dimensional voice coil array actuator according to a third embodiment of the present invention.

FIG. 13 is a view of coil assembly (500) with top support plate (505) removed to expose the coils (501) and bobbins (502). Arrows (I) illustrate the relative direction of current flow in each coil, with each clockwise coil being next to counterclockwise coils as shown. Note that moving laterally across the coil array, the current alternates in direction. Coils (501) are connected in series or parallel, as desired, to produce a single circuit with a single current input and output. Reversing the direction of current input reverses the direction of all arrows shown in FIG. 13, which reverses the direction of force produced.

Figure 14:
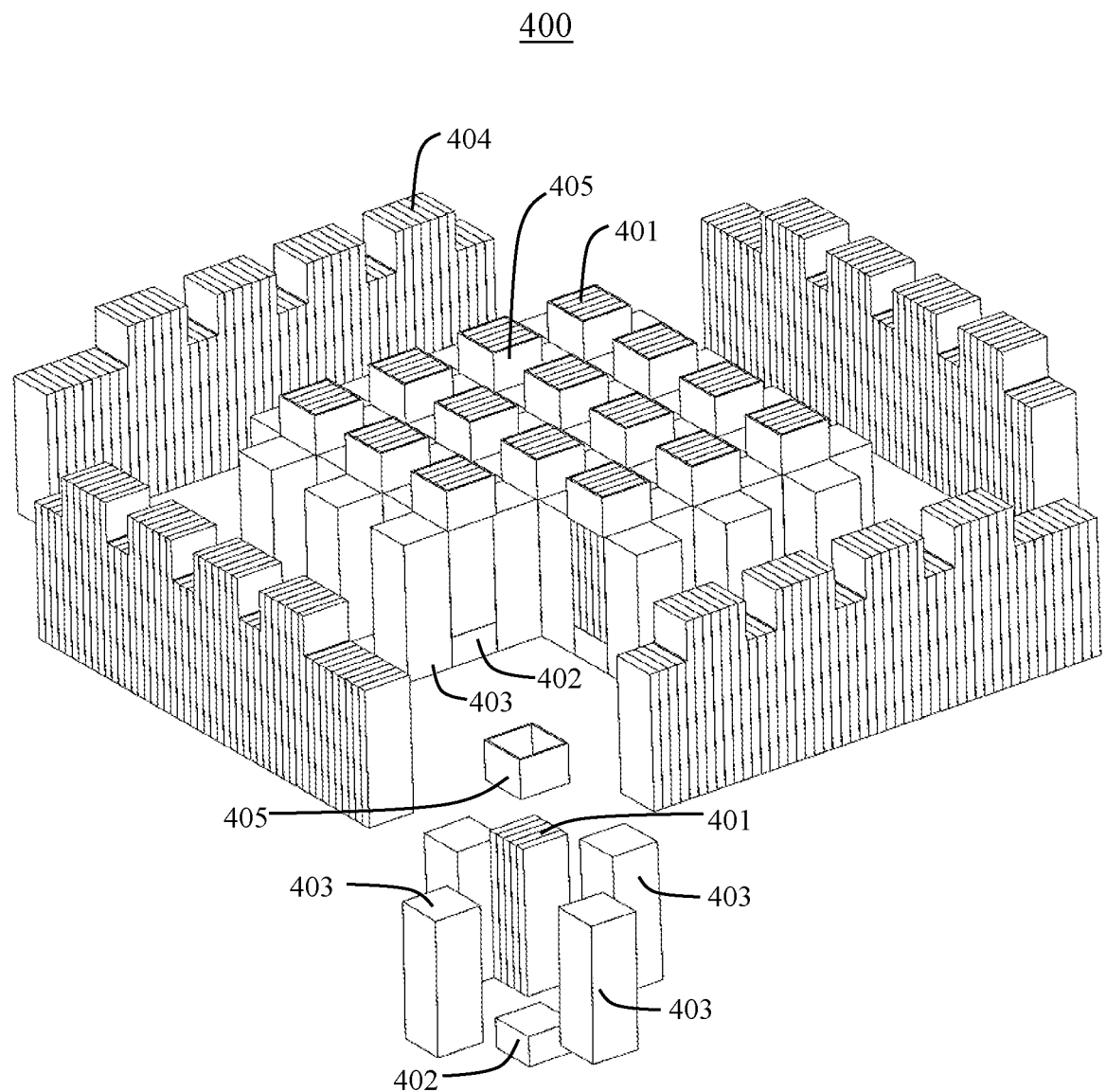
FIG. 14 is an exploded view of the magnet assembly of a two-dimensional voice coil array actuator according to a third embodiment of the present invention.

FIG. 14 is an exploded view of magnet assembly (400). Lateral magnets (403) and vertical magnets (402) are in contact with flux concentrators (401) or with flux returns (404), which form the outer edge of magnet assembly (400). As shown, the flux concentrators (401) form a 4×4 array with uniform spacing corresponding to the coils (501). Shorting rings (405) are provided around the flux concentrators (401). During assembly of two-dimensional array voice coil actuator (40), each flux concentrator (401) of top and bottom magnet assemblies (400a, 400b) aligns with the center of a corresponding coil. Lateral magnets (403) and vertical magnets (402) are preferably made of high strength magnetic material, preferably a magnetic material comprising Neodymium, such as Neodymium Iron Boron (NdFeB). Flux concentrators (401) and flux returns (404) are preferably made of silicon steel or magnetic stainless steel to provide high permeability and low hysteresis. These components may be composed of thin laminations (as shown in FIG. 14) to reduce eddy currents. Shorting rings (405) are preferably made from electrically conductive material, such as copper.

Figure 15:
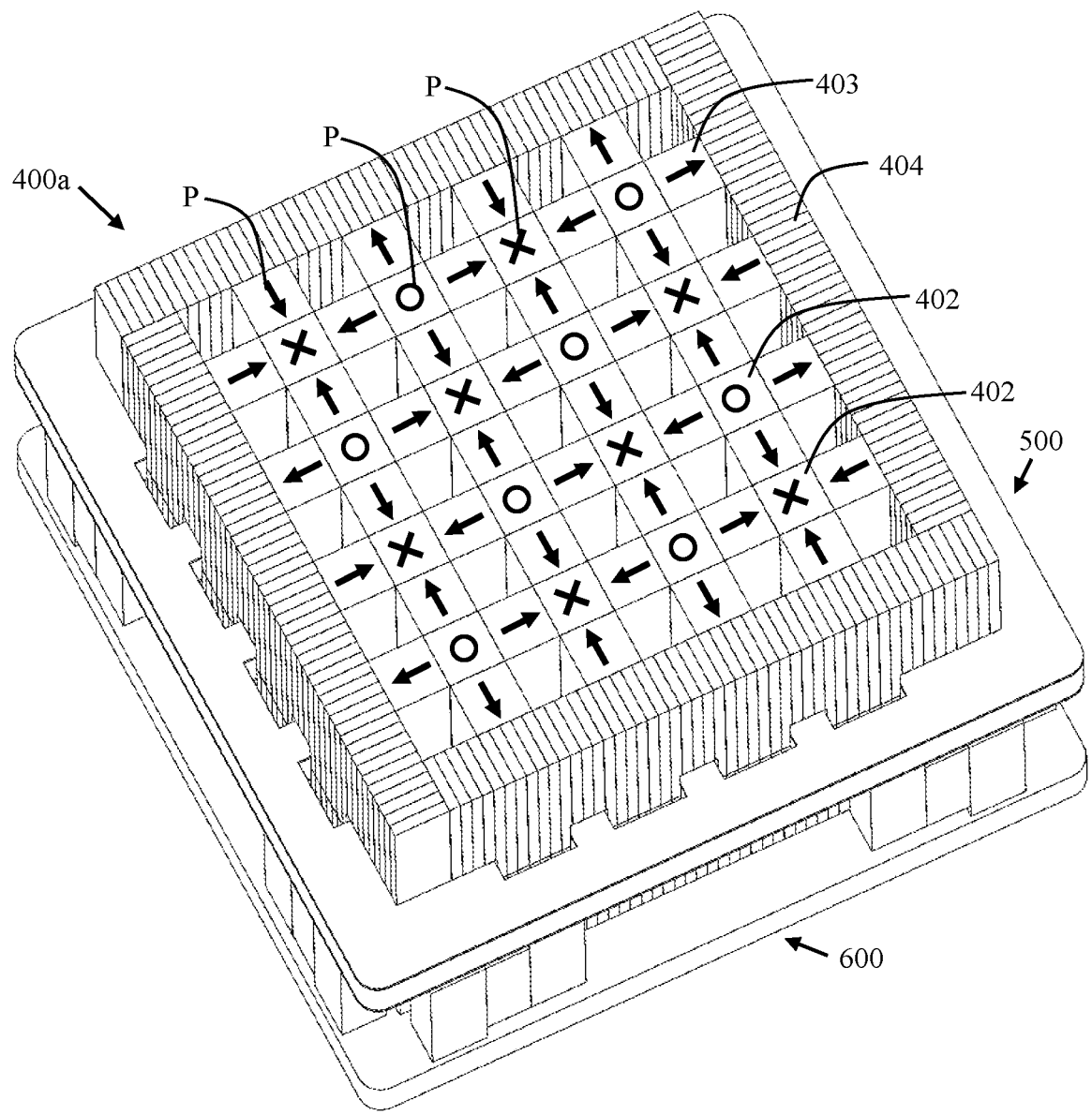
FIG. 15 is a view showing the top of a two-dimensional array voice coil actuator according to a third embodiment of the present invention.

FIG. 15 is a view showing the top of a two-dimensional array voice coil actuator (40) according to the third embodiment of the present invention. The polarization direction of lateral magnets (403) and vertical magnets (402) as viewed from the top is labeled (P) where an arrow indicates lateral polarization, an X indicates downward polarization into the assembly and an O indicates upward polarization out of the assembly. The magnet polarization pattern shown, with lateral magnets surrounding vertical magnets and with their polarization directed inward or outward from the vertical magnets, is commonly known as a Halbach planar array. The lateral magnets (403) and vertical magnets (402) produce a high magnetic flux into the flux concentrators (401, see FIG. 14) of the magnet assemblies (400a, 400b), with very little flux outside of voice coil array actuator (40). Magnetic flux from the top and bottom magnet assemblies (400a, 400b) combine to produce a very high uniform magnetic flux through the coils. The interaction between current passing through the coils (501), as shown in FIG. 13, and the magnetic field produces forces perpendicular to both (which is up-and-down as drawn). It should also be noted that the reluctance of the flux paths of lateral magnets (403) and vertical magnets (402) are less than would be seen by equivalent magnets in a monolithic actuator. Thus, the use of a magnet array in voice coil array actuator (40) requires less total permanent magnetic material and less flux conducting material than would be required in a monolithic actuator that produces similar forces.

Figure 16:
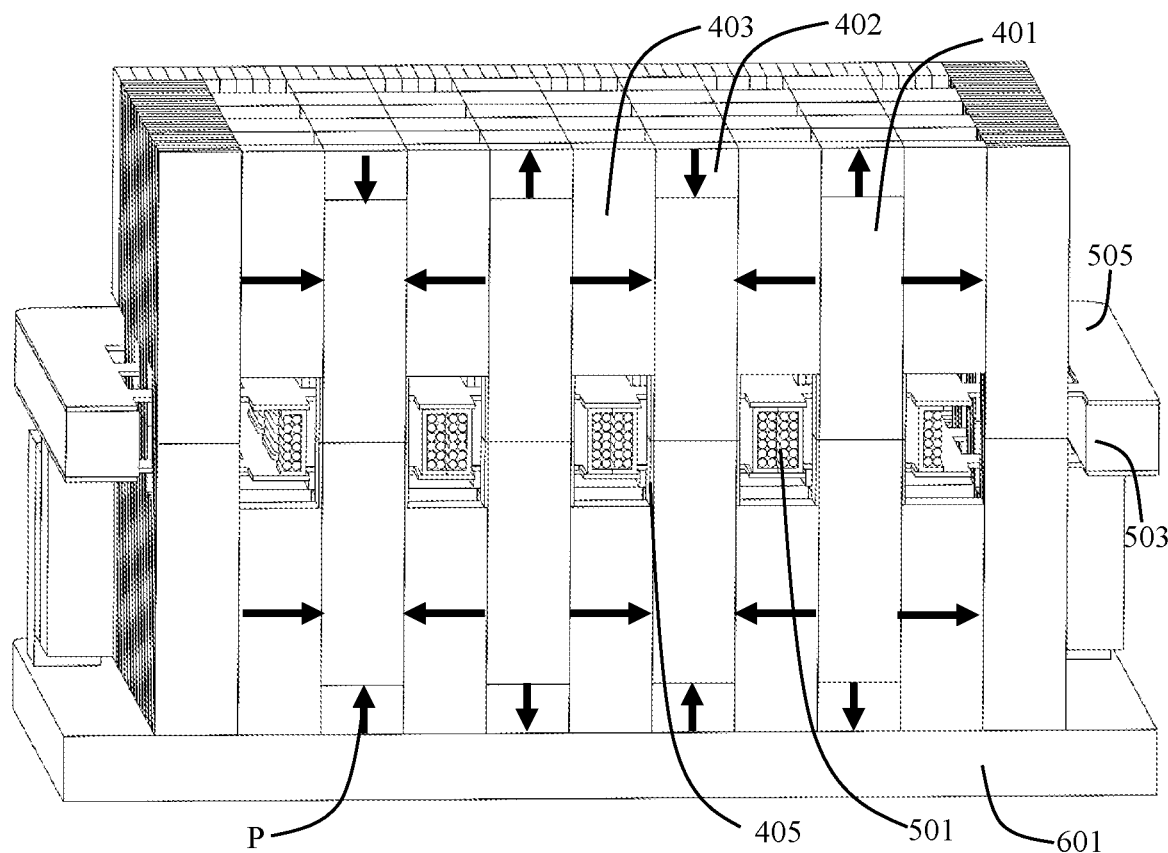
FIG. 16 is a cross-sectional view of a two-dimensional voice coil array actuator according to a third embodiment of the present invention.

FIG. 16 is a cross-sectional view of two-dimensional voice coil array actuator (40) illustrating the relative arrangement of components. It can be seen in FIG. 14 that each shorting ring (405) forms a complete conducting loop around the flux concentrators (401) inside of coils (501). When current flows through coil (501) it induces current loops in shorting ring (405), which cancels the magnetic flux from the coil to reduce the flux linkage and inductance of the coil. It also prevents flux from entering flux concentrators (401) and linking with the other coils (501). Thus, the total inductance of all of the coils (501) is lower than would be exhibited by a single equivalent coil. Flux linkage is directly related to inductance, and in some aspects of the invention, the flux linkage is decreased by at least 25%, preferably by at least 50%. Larger decreases in flux linkage and inductance may be achieved, but may require decreases in coil size and magnets, and corresponding reductions in flux.

It will, of course, be appreciated that the above description has been given by way of example only and that modifications in detail may be made within the scope of the present invention.

Throughout this application, various patents and publications have been cited. The disclosures of these patents and publications in their entireties are hereby incorporated by reference into this application, in order to more fully describe the state of the art to which this invention pertains.

The invention is capable of modification, alteration, and equivalents in form and function, as will occur to those ordinarily skilled in the pertinent arts having the benefit of this disclosure. While the present invention has been described with respect to what are presently considered the preferred embodiments, the invention is not so limited. To the contrary, the invention is intended to cover various modifications and equivalent arrangements included within the spirit and scope of the description provided above.

What is claimed is:

1. A voice coil inertial actuator, comprising:
   a suspension assembly comprising a stationary base and movable mounts;
   a coil assembly comprising:
      an array of coils wound around bobbins; and
      coil end holders supporting the bobbins,
         wherein the coils, bobbins, and coil end holders are joined to move as a unit, and
         wherein the coil assembly is supported by the movable mounts of the suspension assembly, such that the coil assembly is configured to move vertically relative to the stationary base; and
   a magnet assembly attached to the stationary base of the suspension assembly,
   wherein the magnet assembly comprises an array of lateral and vertical permanent magnets in contact with flux concentrators,
   wherein the flux concentrators correspond to and are aligned with the coils of the coil assembly, such that a concentrated uniform magnetic flux is directed laterally through the coils.

2. The voice coil inertial actuator of claim 1, wherein the coils of the coil assembly are arranged as a one-dimensional array, and flux concentrators of the magnet assembly extend through each coil.

3. The voice coil inertial actuator of claim 2, wherein the lateral and vertical magnets are arranged as a linear Halbach array, with alternating up and down polarization interspaced with alternating left and right polarization.

4. The voice coil inertial actuator of claim 3, wherein the linear Halbach array directs flux into the flux concentrators and through the coils such that less than about 10% of the flux is directed outside of the magnet assembly.

5. The voice coil inertial actuator of claim 2, further comprising spaces between adjacent coils, and flux concentrators of the magnet assembly extend through the spaces between adjacent coils, the direction of current flow being the same through all coils.

6. The voice coil inertial actuator of claim 2, wherein the coils are in direct contact with each other, and the direction of current flow alternates such that each coil having clockwise current flow is next to a coil having counterclockwise current flow.

7. The voice coil inertial actuator of claim 1, wherein the coils are arranged as a two-dimensional array, and flux concentrators of the magnet assembly extend through each coil.

8. The voice coil inertial actuator of claim 7, wherein the lateral and vertical magnets are arranged as a planar Halbach array, with lateral magnets surrounding vertical magnets, where polarization of the lateral magnets is directed inward or outward from the vertical magnets.

9. The voice coil inertial actuator of claim 8, wherein the planar Halbach array directs flux into the flux concentrators and through the coils such that less than about 10% of the flux is directed outside of the magnet assembly.

10. The voice coil inertial actuator of claim 7, wherein the coils are in direct contact with each other, and the direction of current flow alternates such that each coil having clockwise current flow is next to a coil having counterclockwise current flow.

11. The voice coil inertial actuator of claim 1, wherein the suspension assembly movable mounts are elastomeric shear mounts.

12. The voice coil inertial actuator of claim 1, further comprising shorting rings forming a complete conducting loop around the flux concentrators inside of the coils, wherein current flowing through the coils induces current loops in the shorting rings, which cancel the magnetic flux from the coils, thereby reducing flux linkage and inductance of the coils.

* * * * *